US012744131B2

(12) United States Patent
Shao et al.

(10) Patent No.: US 12,744,131 B2
(45) Date of Patent: Sep. 22, 2026

(54) REMOTE-CONTROLLED DISMANTLING ROBOT AND DISMANTLING METHOD FOR NUCLEAR FACILITY DECOMMISSIONING

(71) Applicant: China National Nuclear Corporation Sichuan Environmental Protection Engineering Co., Ltd., Guangyuan (CN)

(72) Inventors: Guoqiang Shao, Guangyuan (CN); Yu Chang, Guangyuan (CN); Tianxin An, Guangyuan (CN); Qizhao Ma, Guangyuan (CN); Hao Fan, Guangyuan (CN); Kunlin Mu, Guangyuan (CN); Chao Yang, Guangyuan (CN); Bo Deng, Guangyuan (CN); Jianqiang Wang, Guangyuan (CN); Zhouyang Jiang, Guangyuan (CN); Kun Gong, Guangyuan (CN); Ping Bai, Guangyuan (CN)

( * ) Notice: Subject to any disclaimer, the term of this patent is extended or adjusted under 35 U.S.C. 154(b) by 74 days.

(21) Appl. No.: 18/936,263

(22) Filed: Nov. 4, 2024

(65) Prior Publication Data

US 2026/0024673 A1 Jan. 22, 2026

(30) Foreign Application Priority Data

Jul. 22, 2024 (CN) ........................ 202410979865.0

(51) Int. Cl.

| | |
|---|---|
| ***G21D 1/00*** | (2006.01) |
| ***B25J 5/00*** | (2006.01) |
| ***B25J 13/00*** | (2006.01) |
| ***B25J 15/04*** | (2006.01) |

(52) U.S. Cl.

CPC .............. *G21D 1/003* (2013.01); *B25J 5/005* (2013.01); *B25J 13/006* (2013.01); *B25J 15/04* (2013.01)

(58) Field of Classification Search

CPC ......... G21D 1/003; B25J 5/005; B25J 13/006; B25J 15/04

See application file for complete search history.

(56) References Cited

U.S. PATENT DOCUMENTS

| | | | | |
|---|---|---|---|---|
| 3,826,543 A * | 7/1974 | Muller | .................. | B62D 55/30 305/146 |
| 6,249,994 B1 * | 6/2001 | Oertley | .................. | B62D 55/30 180/9.1 |

(Continued)

FOREIGN PATENT DOCUMENTS

| | | |
|---|---|---|
| CN | 112902670 A | 6/2021 |
| CN | 115680317 A | 2/2023 |

*Primary Examiner* — Wade Miles
*Assistant Examiner* — James Brian Chin

(57) ABSTRACT

Disclosed are a remote-controlled dismantling robot and dismantling method for nuclear facility decommissioning, relating to the technical field of nuclear facility decommissioning. The robot includes a tracked chassis, a hydraulic arm, a hydraulic system, and a quick change mechanism for hydraulic tool head, where the tracked chassis includes a vehicle chassis, a rotating mechanism, track systems, and support leg systems; and the hydraulic arm includes a multi-stage hinged arm and arm oil cylinder. The robot can dismantle to-be-decommissioned nuclear facilities under human remote control, which can decrease the radiation dose to the operators.

5 Claims, 4 Drawing Sheets

(56) References Cited

U.S. PATENT DOCUMENTS

| | | | | |
|---|---|---|---|---|
| 2009/0211823 | A1* | 8/2009 | Shraga | B62D 55/0655 180/9.42 |
| 2011/0235768 | A1* | 9/2011 | Heim | G21D 1/003 976/DIG. 293 |
| 2013/0300181 | A1* | 11/2013 | Bystedt | B25D 17/02 299/10 |
| 2019/0301144 | A1* | 10/2019 | Kean | B25J 5/005 |
| 2019/0360180 | A1* | 11/2019 | Carpenter | B25J 13/006 |
| 2020/0023740 | A1* | 1/2020 | Bystedt | E02F 9/22 |
| 2022/0032472 | A1* | 2/2022 | Nordin | H04N 7/181 |

* cited by examiner

REMOTE-CONTROLLED DISMANTLING ROBOT AND DISMANTLING METHOD FOR NUCLEAR FACILITY DECOMMISSIONING

CROSS-REFERENCE TO RELATED APPLICATIONS

The present application claims priority to Chinese Patent Application No. 2024109798650, filed on Jul. 22, 2024, the entire disclosure of which is incorporated herein by reference.

TECHNICAL FIELD

The present invention relates to the technical field of nuclear facility decommissioning, specifically to a remote-controlled dismantling robot and dismantling method for nuclear facility decommissioning.

BACKGROUND

In nuclear facility decommissioning, the operating environment is complex, the operating method is diverse, and the operating place is highly radioactive. Therefore, automated equipment is often required for nuclear facility decommissioning. However, the existing automated equipment has poor place accessibility, low efficiency, and poor adaptability, and cannot cope with complex working planes and highly radioactive environments in the decommissioning process of old nuclear facilities. In addition, the existing automated equipment is not specifically designed and developed for nuclear facility decommissioning.

Therefore, a remote-controlled dismantling robot special for nuclear facility decommissioning is urgently needed to solve the problems of poor accessibility, low efficiency, and poor adaptability of existing equipment in nuclear facility decommissioning.

SUMMARY

The objective of the present invention is to overcome the shortcomings of the prior art and provide a remote-controlled dismantling robot and dismantling method for nuclear facility decommissioning, where the robot can dismantle to-be-decommissioned nuclear facilities under human remote control, which can reduce the working time of operators on radioactive sites and decrease the radiation dose to the operators.

To achieve the above objective, the technical solution adopted by the present invention is as follows:

A remote-controlled dismantling robot for nuclear facility decommissioning includes a tracked chassis, a hydraulic arm, a hydraulic system, and a quick change mechanism for hydraulic tool head;

the tracked chassis includes a vehicle chassis, a rotating mechanism mounted on the vehicle chassis, track systems mounted on left and right sides of the vehicle chassis, and support leg systems mounted on two front ends of the vehicle chassis;

the hydraulic arm is mounted on the rotating mechanism, and includes a multi-stage hinge arm and arm oil cylinder; and the quick change mechanism for hydraulic tool head is used for quick change connection with a target tool head.

Further, the rotating mechanism includes a rotating support mounted on an upper part of the vehicle chassis and capable of rotating, a rotating platform mounted on the rotating support, and a rotating motor capable of driving the rotating support to rotate.

Further, the track system includes a track, a driving wheel and a driven wheel arranged inside the track and adapted to the track, a driving motor capable of providing power to the driving wheel, a support wheel arranged below the vehicle chassis, and a tensioning oil cylinder fixed on the vehicle chassis; and a piston of the tensioning oil cylinder is connected to the driven wheel.

Further, the support leg system includes a support leg crossbeam hinged to the vehicle chassis, a support leg hinged to the support leg crossbeam, and a support leg oil cylinder connected to the support leg and the support leg crossbeam by hinges.

Further, the hydraulic arm includes a first-stage arm hinged to the rotating platform, and the first-stage arm and the rotating platform are hinged with a first-stage arm oil cylinder; a tail end of the first-stage arm is hinged with a second-stage arm, and a second-stage arm oil cylinder is hinged between the second-stage arm and the first-stage arm; a tail end of the second-stage arm is hinged with a third-stage arm, a tail end of the third-stage arm is hinged with the quick change mechanism for hydraulic tool head, the quick change mechanism for hydraulic tool head is hinged with a connecting rod, the connecting rod and the tail end of the third-stage arm are hinged with a rocker, and a third-stage arm oil cylinder is hinged between the rocker and the third-stage arm; a control valve group is arranged on the rotating platform; and the support leg oil cylinder, the first-stage arm oil cylinder, the second-stage arm oil cylinder, and the third-stage arm oil cylinder are all connected to the control valve group.

Further, the quick change mechanism for hydraulic tool head includes a connecting support hinged to the tail end of the third-stage arm, a hydraulic pipeline arranged inside the connecting support, a hydraulic rotating mechanism connected to a tail end of the connecting support, and a quick change adapter mounted at a front end of the hydraulic rotating mechanism.

Further, the quick change adapter includes a quick change adapter base, an H-shaped hydraulic cylinder arranged in the quick change adapter base, and a hydraulic quick connector socket and an electrical plug mounted on the H-shaped hydraulic cylinder.

The present invention further provides a dismantling method for nuclear facility decommissioning, using the remote-controlled dismantling robot for nuclear facility decommissioning as described above, including:

S1: moving the robot to the front of a required tool head, moving the hydraulic arm to be above the target tool head, and connecting the quick change adapter with the tool head by operating the hydraulic arm and the rotating platform to move; and S2: lifting the hydraulic arm to separate the target tool head from the ground, operating and controlling the H-shaped hydraulic cylinder on the quick change adapter to expand, and inserting the electrical plug and the hydraulic quick connector socket with the movement of the H-shaped hydraulic cylinder to activate hydraulic pressure and electrical control at the target tool head and lock the H-shaped hydraulic cylinder with a pin shaft inside the target tool head, so as to complete loading of the tool head, or complete unloading of the tool head by reverse operations.

Compared with the prior art, the present invention has the following beneficial effects:

The present invention provides a remote-controlled dismantling robot special for nuclear facility decommissioning, where the robot can dismantle to-be-decommissioned nuclear facilities under human remote control, which can reduce the working time of operators on radioactive sites and decrease the radiation dose to the operators.

Figure 1:
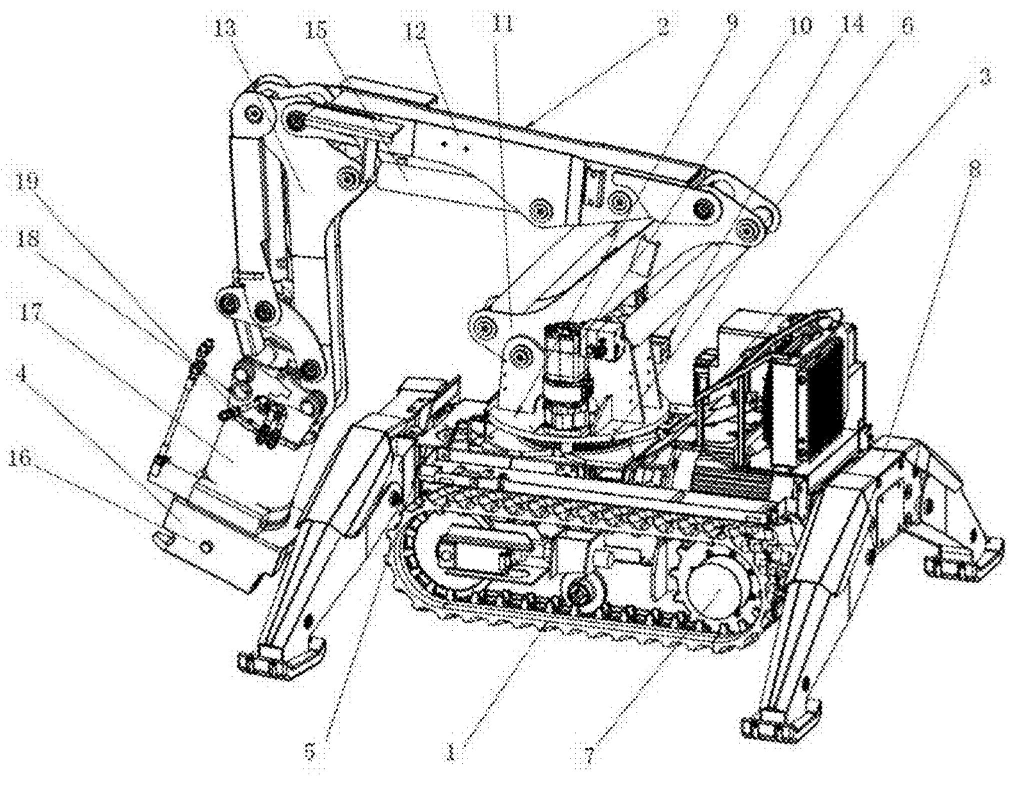
FIG. 1 and FIG. 2 are overall structural diagrams of the present invention.

Names corresponding to reference numerals in the drawings: 1—tracked chassis, 2—hydraulic arm, 3—hydraulic system, 4—quick change mechanism for hydraulic tool head, 5—vehicle chassis, 6—rotating support, 7—track system, 8—support leg system, 9—rotating platform, 10—rotating motor, 11—first-stage arm, 12—second-stage arm, 13—third-stage arm, 14—control valve group, 15—second-stage arm oil cylinder, 16—connecting support, 17—hydraulic rotating mechanism, 18—quick change adapter, 19—hydraulic pipeline, 20—driving wheel, 21—driving motor, 22—driven wheel, 23—tensioning oil cylinder, 24—support wheel, 25—track, 27—support leg, 28—support leg crossbeam, 29—support leg oil cylinder, 30—electrical plug, 31—hydraulic quick connector socket, 32—H-shaped hydraulic cylinder, 33—tool quick change support, 34—tool quick change support upper pin shaft, 35—tool quick change support lower pin shaft, 36—first-stage arm oil cylinder, 37—connecting rod, 38—rocker, 39—third-stage arm oil cylinder, 40—tool head.

DETAILED DESCRIPTION OF THE EMBODIMENTS

The present invention will be further explained below in conjunction with the accompanying drawings and embodiments, and the implementation of the present invention includes but is not limited to the following embodiments.

Figure 2:
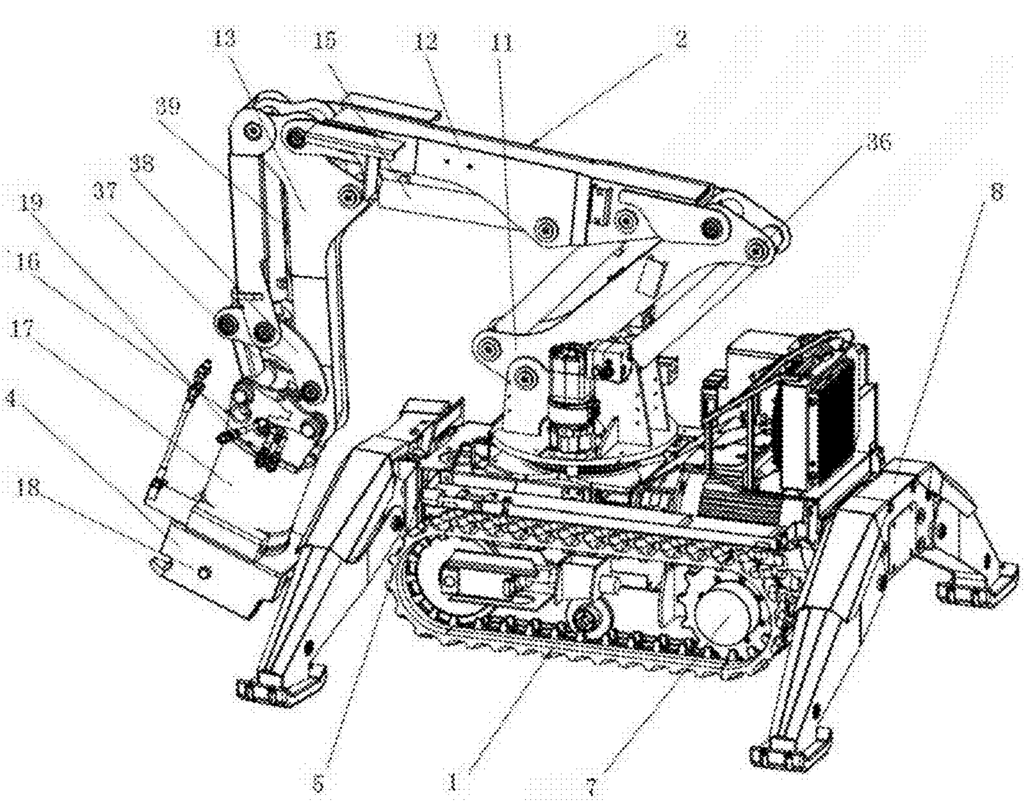

As shown in FIG. 1 and FIG. 2, this embodiment provides a remote-controlled dismantling robot for nuclear facility decommissioning, including a tracked chassis 1, a hydraulic arm 2, a hydraulic system 3, and a quick change mechanism for hydraulic tool head 4.

The tracked chassis 1 includes a vehicle chassis 5 that plays a supporting role, a rotating support 6 mounted at an upper part of the vehicle chassis 5 and capable of rotating, a rotating platform 9 mounted on the rotating support 6 and capable of rotating synchronously with the rotating support 6, and a rotating motor 10 capable of driving the rotating support 6 to rotate; track systems 7 that enable the robot to move are mounted below left and right sides of the vehicle chassis 5, and support leg systems 8 that can support the robot are mounted on front and rear sides of the vehicle chassis 5.

Figure 3:
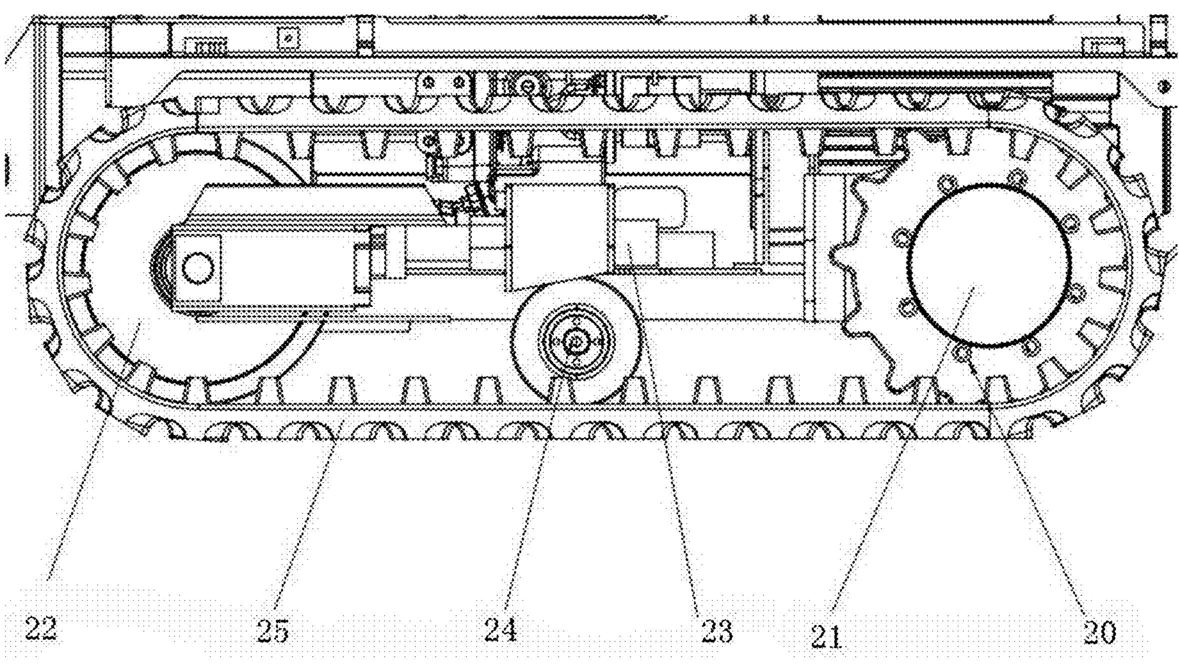
FIG. 3 is a structural diagram of a track system in the present invention.
Figure 4:
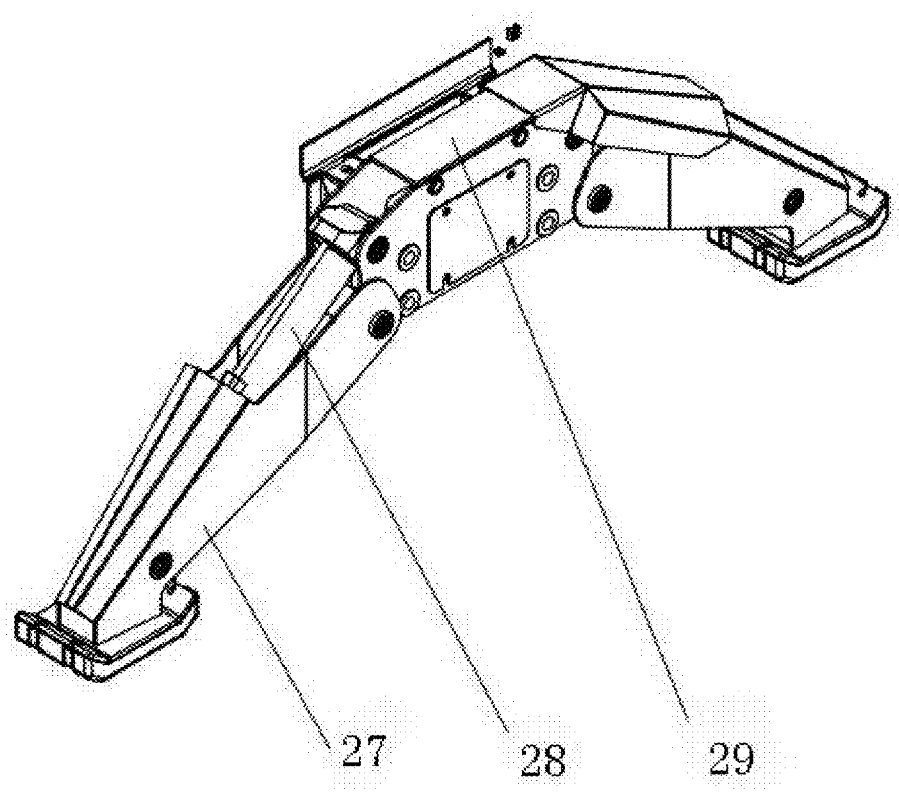
FIG. 4 is a structural diagram of an unfolded support leg system in the present invention.

As shown in FIG. 3, the track system 7 includes a track 25, and a driving wheel 20 and a driven wheel 22 arranged inside the track 25 and adapted to the track 25, where the driving wheel 20 is located at the rear and the driven wheel 22 is located at the front. In addition, a driving motor 21 that provides power to the driving wheel 20, a support wheel 24 that can keep the track 25 stable and is arranged below the vehicle chassis 5, and a tensioning oil cylinder 23 fixed on the vehicle chassis 5, are provided. A piston of the tensioning oil cylinder 23 is connected to the driven wheel 22. As shown in FIG. 4, the support leg system 8 includes a support leg crossbeam 28 hinged to the vehicle chassis 5, a support leg 27 hinged to the support leg crossbeam 28, and a support leg oil cylinder 29 connected to the support leg 27 and the support leg crossbeam 28 by hinges.

The hydraulic arm 2 is fixedly mounted on the rotating platform 9 and includes a first-stage arm 11 hinged to the rotating platform 9, and the first-stage arm 11 and the rotating platform 9 are hinged with a first-stage arm oil cylinder 36; a tail end of the first-stage arm 11 is hinged with a second-stage arm 12, and a second-stage arm oil cylinder 15 is hinged between the second-stage arm 12 and the first-stage arm 11; a tail end of the second-stage arm 12 is hinged with a third-stage arm 13, a tail end of the third-stage arm 13 is hinged with the quick change mechanism for hydraulic tool head 4, the quick change mechanism for hydraulic tool head 4 is hinged with a connecting rod 37, the connecting rod 37 and the tail end of the third-stage arm 13 are hinged with a rocker 38, and a third-stage arm oil cylinder 39 is hinged between the rocker 38 and the third-stage arm 13. In addition, a control valve group 14 is arranged on the rotating platform 9; and the support leg oil cylinder 29, the first-stage arm oil cylinder 36, the second-stage arm oil cylinder 15, and the third-stage arm oil cylinder 39 are all connected to the control valve group.

Figure 5:
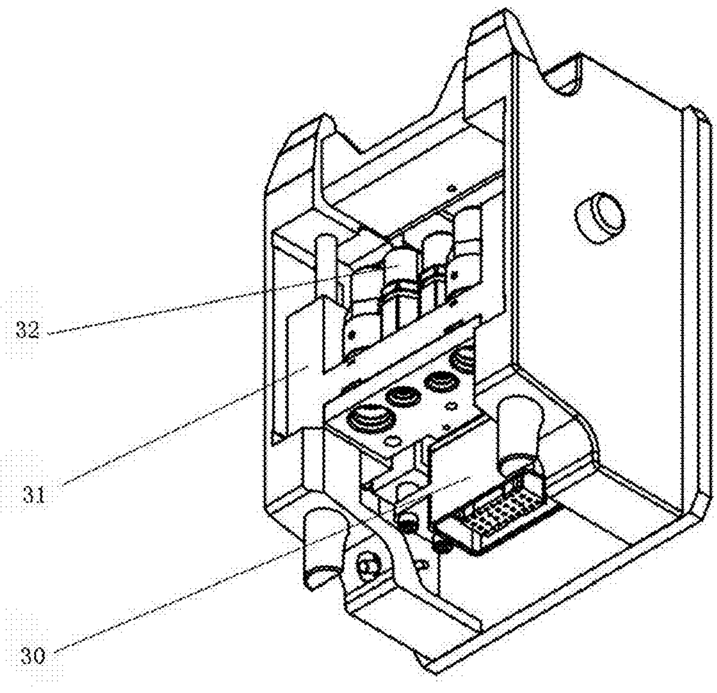
FIG. 5 is a bottom view of a quick change adapter at a tail end of a quick change mechanism for hydraulic tool head in the present invention.

The quick change mechanism for hydraulic tool head 4 includes a connecting support 18 hinged to the tail end of the third-stage arm 13, a hydraulic pipeline 19 arranged inside the connecting support 18, a hydraulic rotating mechanism 17 connected to a tail end of the connecting support 18, and a quick change adapter 16 mounted at a front end of the hydraulic rotating mechanism 17. As shown in FIG. 5, the quick change adapter 16 includes a quick change adapter base, an H-shaped hydraulic cylinder 32 arranged in the quick change adapter base, and a hydraulic quick connector socket 31 and an electrical plug 30 mounted on the H-shaped hydraulic cylinder 32.

The robot provided in this embodiment further includes a motor, a hydraulic pump, a hydraulic oil tank, an air cooling system, a driving motor, a rotating oil cylinder, an accumulator, and a hydraulic pipeline mounted on the vehicle chassis 5, which can be mounted at corresponding portions of the robot according to actual usage needs.

Figure 6:
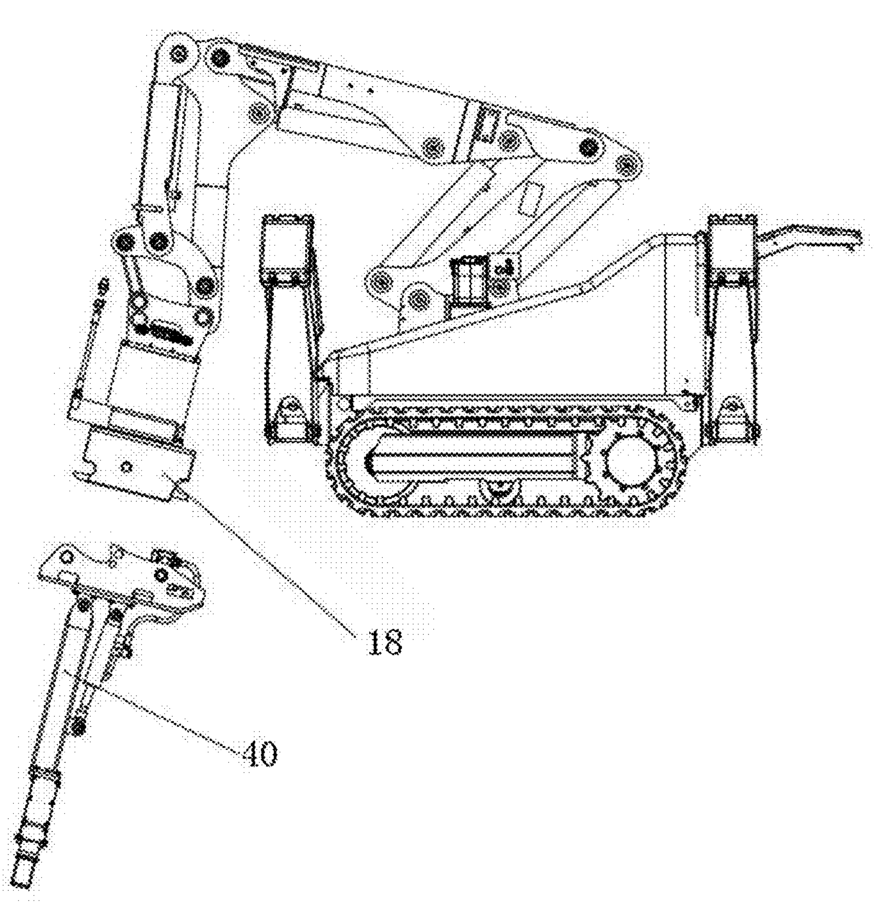
FIG. 6 is a working state diagram of a robot in the present invention.
Figure 7:
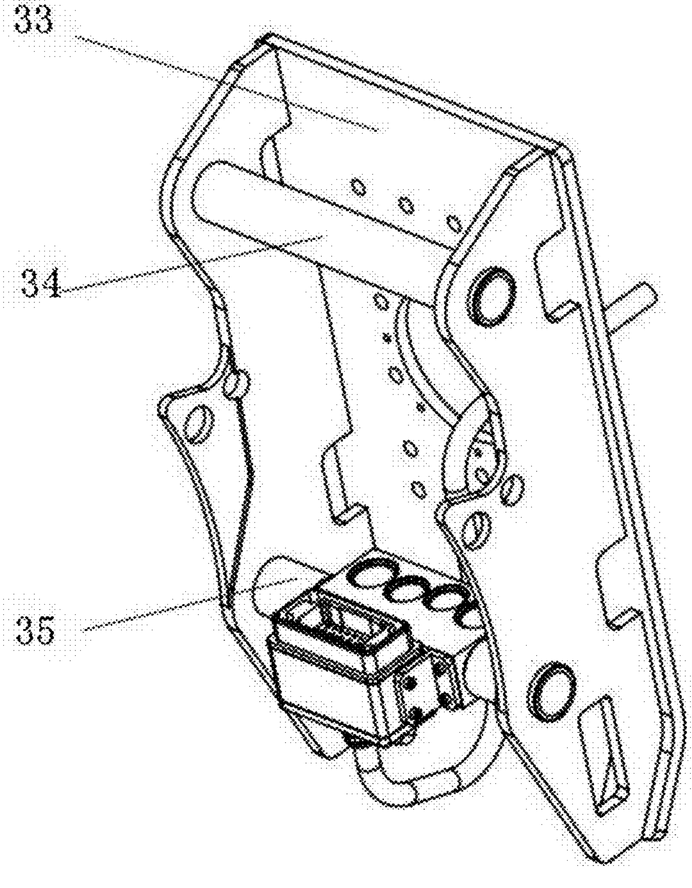
FIG. 7 is a top view of a tool head.

A dismantling method for nuclear facilities using the remote-controlled dismantling robot for nuclear facility decommissioning provided above is as follows:

First, the robot is moved to the front of a tool head 40 (the tool head is used for dismantling nuclear facilities and mounted with a component that can be adapted to the quick change adapter on the dismantling robot), the hydraulic arm 2 is moved to be above the required tool head, as shown in FIG. 6 and FIG. 7, and a slot on the quick change adapter 18 is connected to a tool quick change support upper pin shaft 34 of the tool head by operating the hydraulic arm 2 and the rotating platform 9 to move;

Then, the hydraulic arm 2 is lifted to separate the tool head from the ground, a mounting plane of the tool quick change support 33 is perpendicular to a horizontal plane, the H-shaped hydraulic cylinder 32 on the quick change adapter 18 is operated and controlled to expand, and the electrical plug 30 and the hydraulic quick connector socket 31 are inserted with the movement of the H-shaped hydraulic cylinder 32 to activate hydraulic pressure and electrical control at the tool head, and the H-shaped hydraulic cylinder 32 locks a tool quick change support lower pin shaft 35 of the tool head, so as to complete loading of the tool head, or complete unloading of the tool head by reverse operations.

When the robot is working normally, the accumulator of the hydraulic system maintains the expansion state of the tensioning oil cylinder in the track system, so that the driven wheel maintains sufficient tension; and pressure protection design is provided to prevent the track from being too tight.

When the track of the robot needs to be replaced due to contamination or damage by radioactive isotopes, the tensioning oil cylinder is controlled to contract, the driven wheel follows the oil cylinder to move, the wheelbase between the driven wheel and the driving wheel decreases, the track is adjusted from a tensioned state to a relaxed state, and the track can be removed from the vehicle chassis of the robot. After the track is replaced with a new one, the tensioning oil cylinder is controlled to tension, the tensioning wheel follows the oil cylinder to move, the wheelbase between the driven wheel and the driving wheel increases, the track is adjusted from the relaxed state to the tensioned state, and the robot can continue to travel.

2 power interfaces and an electrical plug are provided at the tail of the robot. When 1 power interface of the robot is faulty and cannot be connected, an electric rotating tool can be inserted into a rotating interface above the electrical plug at the tail of the robot, and the electric rotating tool drives a worm gear mechanism therein to rotate, so as to unlock the electrical plug. Then, the plug is pulled out using a long rod tool and inserted into a spare interface to connect the power of the robot, and the robot recovers from the fault state.

A platform expansion interface is provided at the tail of the robot for towing a mobile power supply trolley. When the robot loses external power supply, the robot can be powered by the mobile power supply to leave the workplace. The platform expansion interface can also be used for towing a counterweight trolley to prevent the robot from turning over or overturning when the robot performs remote heavy load operations.

In addition, 4 cameras and 1 laser radar are mounted on the robot, where the cameras can provide real-time feedback on current states of the robot and the environment. In a dark environment, the background can implement three-dimensional modeling on the surrounding environment by scanning of the laser radar, so as to perceive the state of the environment.

The above embodiment is only one of the preferred embodiments of the present invention and should not be used for limiting the scope of protection of the present invention. Any meaningless modifications or embellishments made to the main design idea and spirit of the present invention, which still solve the same technical problems as the present invention, should be included within the scope of protection of the present invention.

What is claimed is:

1. A remote-controlled dismantling robot for nuclear facility decommissioning, comprising a tracked chassis, a hydraulic arm, a hydraulic system, and a quick change mechanism for hydraulic tool head, wherein the tracked chassis comprises a vehicle chassis, a rotating mechanism mounted on the vehicle chassis, track systems mounted on left and right sides of the vehicle chassis, and support leg systems mounted on two front ends of the vehicle chassis;

the hydraulic arm is mounted on the rotating mechanism, and comprises a multi-stage hinged arm and arm oil cylinder; and the quick change mechanism for hydraulic tool head is used for quick change connection with a target tool head;

wherein the rotating mechanism comprises a rotating support mounted on an upper part of the vehicle chassis and capable of rotating, a rotating platform mounted on the rotating support, and a rotating motor capable of driving the rotating support to rotate;

wherein the track system comprises a track, a driving wheel and a driven wheel arranged inside the track and adapted to the track, a driving motor capable of providing power to the driving wheel, a support wheel arranged below the vehicle chassis, and a tensioning oil cylinder fixed on the vehicle chassis; and a piston of the tensioning oil cylinder is connected to the driven wheel;

wherein the support leg system comprises a support leg crossbeam hinged to the vehicle chassis, one support leg hinged to the support leg crossbeam and a support leg oil cylinder connected to the support leg and the support leg crossbeam by hinges;

wherein two support leg crossbeams are provided systematically with the support leg oil cylinder, and two support legs are provided systematically with the support leg oil cylinder;

the two support leg crossbeams and the two support legs each are inclinedly provided from the support leg oil cylinder to a ground;

the two support legs are moveable towards each other under driving of the support leg oil cylinder, such that the tracked chassis is lifted up when the two support legs are moveable toward each other.

2. The remote-controlled dismantling robot for nuclear facility decommissioning according to claim 1, wherein the hydraulic arm comprises a first-stage arm hinged to the rotating platform, and the first-stage arm and the rotating platform are hinged with a first-stage arm oil cylinder; a tail end of the first-stage arm is hinged with a second-stage arm, and a second-stage arm oil cylinder is hinged between the second-stage arm and the first-stage arm; a tail end of the second-stage arm is hinged with a third-stage arm, a tail end of the third-stage arm is hinged with the quick change mechanism for hydraulic tool head, the quick change mechanism for hydraulic tool head is hinged with a connecting rod, the connecting rod and the tail end of the third-stage arm are hinged with a rocker, and a third-stage arm oil cylinder is hinged between the rocker and the third-stage arm; a control valve group is arranged on the rotating platform; and the support leg oil cylinder, the first-stage arm oil cylinder, the second-stage arm oil cylinder, and the third-stage arm oil cylinder are all connected to the control valve group.

3. The remote-controlled dismantling robot for nuclear facility decommissioning according to claim 2, wherein the quick change mechanism for hydraulic tool head comprises a connecting support hinged to the tail end of the third-stage arm, a hydraulic pipeline arranged inside the connecting support, a hydraulic rotating mechanism connected to a tail end of the connecting support, and a quick change adapter mounted at a front end of the hydraulic rotating mechanism.

4. The remote-controlled dismantling robot for nuclear facility decommissioning according to claim 3, wherein the quick change adapter comprises a quick change adapter base, an H-shaped hydraulic cylinder arranged in the quick change adapter base, and a hydraulic quick connector socket and an electrical plug mounted on the H-shaped hydraulic cylinder.

5. A dismantling method for nuclear facility decommissioning, using the remote-controlled dismantling robot for nuclear facility decommissioning according to claim 4, comprising:

S1: moving the robot to the front of a required target tool head, moving the hydraulic arm to be above the target tool head, and connecting the quick change adapter with the tool head by operating the hydraulic arm and the rotating platform to move; and S2: lifting the hydraulic arm to separate the target tool head from the ground, operating and controlling the H-shaped hydraulic cylinder on the quick change adapter to expand, and inserting the electrical plug and the hydraulic quick connector socket with the movement of the H-shaped hydraulic cylinder to activate hydraulic pressure and electrical control at the target tool head and lock the H-shaped hydraulic cylinder with a pin shaft inside the target tool head, so as to complete loading of the tool head, or complete unloading of the tool head by reverse operations.

* * * * *